US008837521B2

(12) United States Patent
Sergeev et al.

(10) Patent No.: US 8,837,521 B2
(45) Date of Patent: Sep. 16, 2014

(54) ETHERNET NETWORK WITHIN MPLS NETWORK

(75) Inventors: Andrew Sergeev, Kfar-Sava (IL); Mishael Shimon Wexler, Beit-Shemesh (IL)

(73) Assignee: ECI Telecom Ltd., Petach-Tikva (IL)

( * ) Notice: Subject to any disclaimer, the term of this patent is extended or adjusted under 35 U.S.C. 154(b) by 232 days.

(21) Appl. No.: 13/508,315

(22) PCT Filed: Oct. 28, 2010

(86) PCT No.: PCT/IL2010/000898
§ 371 (c)(1),
(2), (4) Date: May 4, 2012

(87) PCT Pub. No.: WO2011/058546
PCT Pub. Date: May 19, 2011

(65) Prior Publication Data
US 2012/0224583 A1 Sep. 6, 2012

(30) Foreign Application Priority Data

Nov. 12, 2009 (IL) .......................................... 202067

(51) Int. Cl.
*H04J 3/16* (2006.01)
*H04L 12/413* (2006.01)
*H04L 12/721* (2013.01)
*H04L 12/46* (2006.01)
*H04L 12/723* (2013.01)
*H04L 12/701* (2013.01)

(52) U.S. Cl.
CPC .............. *H04L 45/00* (2013.01); *H04L 12/413* (2013.01); *H04L 45/66* (2013.01); *H04L 12/4633* (2013.01); *H04L 45/68* (2013.01); *H04L 45/50* (2013.01)
USPC ......... 370/466; 370/254; 370/395.5; 370/401

(58) Field of Classification Search
CPC ...................................................... H04L 45/50
See application file for complete search history.

(56) References Cited

U.S. PATENT DOCUMENTS

| 7,372,870 | B2 * | 5/2008 | Huang et al. ................... 370/466 |
| 7,436,782 | B2 * | 10/2008 | Ngo et al. ...................... 370/254 |
| 7,613,188 | B1 * | 11/2009 | French et al. .................. 370/392 |
| 8,014,410 | B2 * | 9/2011 | Sergeev et al. ................ 370/401 |
| 8,504,727 | B2 * | 8/2013 | Mohan et al. .................. 709/249 |
| 8,594,127 | B2 * | 11/2013 | Miyabe ......................... 370/466 |
| 2006/0187950 | A1 * | 8/2006 | Bou-Diab et al. ............. 370/432 |
| 2007/0076719 | A1 | 4/2007 | Allan et al. |
| 2008/0172497 | A1 | 7/2008 | Mohan et al. |
| 2009/0016365 | A1 | 1/2009 | Sajassi et al. |
| 2009/0175274 | A1 | 7/2009 | Aggarwal et al. |
| 2011/0280580 | A1 * | 11/2011 | Wexler ............................ 398/79 |
| 2012/0120955 | A1 * | 5/2012 | Vissers et al. ................. 370/392 |
| 2012/0224583 | A1 * | 9/2012 | Sergeev et al. .............. 370/395.5 |
| 2014/0023081 | A1 * | 1/2014 | Mohan et al. ............ 370/395.53 |

FOREIGN PATENT DOCUMENTS

EP    1 585 262    10/2005

OTHER PUBLICATIONS

Martini et al., "Encapsulation Methods for Transport of Ethernet over MPLS Networks", IETF RFC 4448, Apr. 2006, pp. 1-17.
The Internet Society, "Framework for Layer 2 Virtual Private Networks (L2VPNs)", Network Working Group, Sep. 2006, pp. 1-49.
International Search Report mailed Feb. 25, 2011, in International Application PCT/IL2010/000898, filed Oct. 28, 2010.
Written Opinion for PCT/IL2010/000898 mailed Feb. 25, 2011.

* cited by examiner

*Primary Examiner* — Robert Wilson
(74) *Attorney, Agent, or Firm* — Novick, Kim & Lee, PLLC; Harold L. Novick; Jae Youn Kim (57) ABSTRACT

Creating an Ethernet network, within an existing MPLS network, for one or more specified traffic services by selecting in the MPLS network one or more bidirectional non-disjoint LSPs between dual-enabled nodes, presenting these LSPs as Ethernet-enabled links, deploying over them an Ethernet protocol and forwarding there-along dedicated Ethernet over MPLS packets according to Ethernet forwarding rules regardless any MPLS labels except for a predetermined dedicated LSP label.

6 Claims, 4 Drawing Sheets

UNI= USER NETWORK INTERFACE
PE= PROVIDER EDGE
P= PROVIDER NODE

ETHERNET NETWORK WITHIN MPLS NETWORK

CROSS-REFERENCE TO RELATED APPLICATIONS

This Application is the National Phase of International Patent Application No. PCT/IL2010/000898 filed Oct. 28, 2010 and designating the United States, which claims priority to Israel Patent Application No. IL 202067, filed Nov. 12, 2009.

FIELD OF THE INVENTION

The present invention relates to a technology of transmitting telecommunication traffic over an existing multi-protocol label switching (MPLS) network.

BACKGROUND OF THE INVENTION

MPLS networks have become the most advanced and widely utilized networks in the modern communication world.

The MPLS technology gives rise to development of various methods for traffic transmission and traffic protection. In many cases, the pure MPLS approach to traffic management is being fulfilled by other communication technologies, for example when data traffic of a non-MPLS origin must be transmitted over MPLS network.

One of the popular topics presently discussed by network providers, network designers and users is transmission of Ethernet traffic over MPLS networks. There are also s versions of how to protect such traffic in MPLS networks.

An EoMPLS (Ethernet over MPLS) technology, applying Ethernet to the MPLS has been recently devised. The EoMPLS is a technology of transferring Ethernet data over the MPLS network; it constructs a virtual Ethernet on the MPLS network, namely—on the MPLS pseudo wires (PWs), to enable constructing of a high-speed and large scale LAN.

However, the EoMPLS is required to implement a plurality of complicated routing protocols intrinsic for MPLS, thereby both the development of products realizing EoMPLS, and operation of the obtained system become very complicated. This fact is against the advantage which Ethernet networks originally have—i.e., against simplicity of the operation. In view of that, it becomes impossible for the user to fully enjoy benefits the Ethernet originally provides.

US2007076719A describes an Ethernet virtual switched sub-network (VSS), implemented as a virtual hub and spoke architecture overlaid on hub and spoke connectivity built of a combination of Provider Backbone Transport (spokes) and a provider backbone bridged sub-network (hub).

The distributed switching fabric sub-network over which the hub is overlaid can be, for example, an MPLS virtual private network configuration (VPLS).

The solution of US2007076719A discusses in details creating of an Ethernet virtual switched sub-network over the top of PBT/PBB infrastructure, however it does not disclose how an Ethernet virtual network can be created over MPLS infrastructure.

US 2008172497 and a group of other similar references describes a technique for interworking Ethernet and MPLS networks, where the two different networks are just interconnected, not that one is created on top of the other.

So-called Ethernet "pseudowires" may be provisioned over a network of tunnels through a Layer-3 network, such as Multi-Protocol Label Switching (MPLS) tunnels, as described by Martini et al., in "Encapsulation Methods for Transport of Ethernet over MPLS Networks," published as IETF RFC 4448 (April, 2006). An Ethernet "pseudowire" (PW) is used to carry Ethernet/802.3 Protocol. It should be kept in mind, however, that the so-called Ethernet PW is nothing different that the MPLS PW, being a generic mechanism for transmitting Layer-2 services (Ethernet, ATM, FR, CES) over MPLS. IETF RFC 4448 specifies the encapsulation of Ethernet/802.3 PDUs within a pseudowire. It also specifies the procedures for using a PW to provide a "point-to-point Ethernet" service.

IETF RFC 4664 which describes the framework for Layer 2 Virtual Private Networks (VPNs), discusses the full-mesh of pseudowires required for VPLS (Virtual networks over MPLS) services: "3.4.4. Scaling Issues in VPLS Deployment In general, the PSN supports a VPLS solution with a tunnel from each VPLS-PE (Provider Edge) to every other VPLS-PE participating in the same VPLS instance. Strictly, VPLS-PEs with more than one VPLS instance in common only need one tunnel, but for resource allocation reasons it might be necessary to establish several tunnels. For each VPLS service on a given VPLS-PE, it needs to establish one pseudowire to every other VPLS-PE participating in that VPLS service. In total, n*(n−1) pseudowires must be setup between the VPLS-PE routers. In a large scale deployment this obviously creates scaling problems . . . . "

To the best of the Applicant's knowledge, the prior art describes technologies which, even if allow building an Ethernet (virtual) network over MPLS, do not allow utilizing simplicity of Ethernet, such as a simple any to any interconnection (say, multipoint to multipoint connectivity), simple ways of traffic protection, so-called timing-over-Ethernet (the Ethernet's way of delays equalization), etc.

OBJECT AND SUMMARY OF THE INVENTION

It is therefore the object of the present invention to provide a solution being a new step towards maximally utilizing advantages of Ethernet when forming an Ethernet network over an MPLS network.

It goes without saying that the task to build Ethernet over MPLS may be set only when an MPLS network (~Layer 2.5) is arranged over a non-Ethernet underlying network (Layer 1 or 2), such as SDH/SONET, WDM, since if the underlying network is Ethernet, the task becomes not actual.

First of all, it should be noted that the present invention proposes building, over an existing MPLS network, such an Ethernet network which can be called "real Ethernet network" in contrast with a virtual Ethernet network described in the prior art. While all presently known techniques of Ethernet over MPLS utilize Ethernet encapsulations in MPLS packets transmitted over pseudo wires (PWs) of MPLS network, the invention skips the level of pseudo wires and proposes:

A method for configuring two nodes in a Multiple Protocol Label Switched (MPLS configuring, by a Network Management System (NMS) terminal, a connection between a first node and a second node in the MPLS network to support one or more non-disjoint label switched paths (LSP), and configuring said two nodes to perform Ethernet to MPLS protocol encapsulation in addition to MPLS switching, which results in the first node and the second node being Ethernet-enabled nodes and the one or more non-disjoint LSPs to be Ethernet enabled links;

wherein, upon receiving at either the first node or the second node an Ethernet packet from an external Ethernet network:

adding a dedicated label which is determined based upon traffic service specified in the received Ethernet packet, before the Ethernet packet is encapsulated within a MPLS packet thereby forming an encapsulated packet;

forwarding the encapsulated packet over the Ethernet enabled links; and upon receiving at either the first node or the second node a conventional MPLS packet:

forwarding the conventional MPLS packet over at least one LSP which is not Ethernet enabled link.

When utilizing the method in the operating MPLS network, it comprises a step of producing the dedicated Ethernet over MPLS packets by encapsulating Ethernet packets into said dedicated packets and respectively applying to them said one or more dedicated LSP labels at said two or more Ethernet enabled nodes. The provided Ethernet network will be utilized by carrying the dedicated packets of said specified traffic services along said Ethernet enabled links.

In one preferred embodiment, the dedicated LSP label may be the only MPLS label existing in the dedicated MPLS packets; say, the dedicated MPLS packets do not comprise a Pseudo Wire (PW) label.

In one embodiment, each of said predetermined LSP labels is assigned to a particular one of said specified traffic services.

The bidirectional non-disjoint LSPs may constitute bidirectional non-disjoint communication links or lines connecting nodes of the MPLS network. In another preferred embodiment, the bidirectional non-disjoint LSPs may be one-hop LSPs connecting adjacent nodes of the MPLS network.

In yet another preferred embodiment, the one or more specified services are multipoint to multipoint services.

The method may therefore comprise a preliminary step of selecting said bidirectional non-disjoint LSPs suitable for the specified traffic services.

Still further, the method may comprise providing traffic protection in said Ethernet network for said specified traffic services, using measures accepted in Ethernet networks.

Deployment of an Ethernet protocol on said created Ethernet network ensures the Ethernet forwarding and learning rules, and preferably also traffic protection measures; the present invention proposes applying such rules and measures only to the dedicated packets.

As mentioned, the dedicated packets (dedicated MPLS packets) of the present invention are Ethernet over MPLS packets having their specific encapsulation and provided with specified LSP labels; however, they may be considered as quasi-Ethernet packets since they are forwarded and learned, in the created Ethernet network, as Ethernet packets.

The created dedicated MPLS packets, though carrying inside an MPLS label of LSP, are actually forwarded over physical links in the network underlying MPLS—and not over "virtual" pseudo wires of the MPLS network. (Indeed, physical paths of a bidirectional PW may be disjoint, so the PW as a wire is virtual). Such a network where Ethernet packets are carried over physical links can indeed be called a real Ethernet network. As any real Ethernet network, the proposed network has the well-known advantages which can successfully be utilized. The proposed technique of providing Ethernet over MPLS is a) much simpler itself than the conventional Ethernet over MPLS technology, and b) allows utilizing simplicity of the obtained Ethernet network.

The obtained network actually comprises two networks—the MPLS one and the Ethernet one. The MPLS services and the proposed specified Ethernet services will utilize the obtained network simultaneously.

To allow forming Ethernet packets in the MPLS network, at least two nodes of the MPLS network must be both MPLS enabled and Ethernet-enabled (so-called dual-enabled nodes or dual nodes). To support both MPLS and Ethernet traffic services between these two nodes, at least one bidirectional communication line (LSP) must exist between these two nodes.

The MPLS services and the Ethernet (specified) services may simultaneously utilize a specific bidirectional link, assigned to the Ethernet network, using different LSPs.

The mentioned one or more specified traffic services are, for example, new mp-t-mp services which are extremely "inconvenient" for being organized on the MPLS network. In particular, the invention solves the problem of organizing such new services in the existing MPLS network, and the solution is much simpler than it would be by MPLS means.

To recognize and differently handle different traffic services, the method comprises discrimination of incoming services at any of the dual nodes of the MPLS network, and applying to different services different encapsulation rules and different forwarding rules.

For example, for conventional MPLS networks' services such as VPLS services, usual MPLS packets will be formed and forwarded, but for some predetermined newly organized services—the proposed dedicated MPLS packets will be formed and used. For example, the Ethernet forwarding will be used for new mp-t-mp services, or for other services identified by a network management system/a node controller as the specified traffic services requiring the "Ethernet treatment". The mentioned dual-enabled network nodes may be configured to behave as conventional MPLS nodes for one (first) group of services, and as "dedicated MPLS" nodes for another (second) group of services requiring the Ethernet treatment.

For example, Ethernet packets of some specified service (belonging to such a second group of services), arriving to an edge node between an outside Ethernet network and our existing MPLS network (the edge node—Provider Edge PE—is also a dual-enabled node according to the invention), will be recognized as such by the node and encapsulated into the dedicated MPLS packets provided with a service tag and a specified, predetermined LSP label. Such a label will serve the identifier of the packets which should be treated (forwarded, learned) as Ethernet packets in an Ethernet network created in the MPLS network.

The specified LSP label(s) should be selected/predetermined by an operator or by some centralized control entity (for example, NMS) to indicate traffic streams/services which are defined by the operator/entity to be presented as Ethernet traffic streams.

More specifically, the method may comprise the following operations of forming an Ethernet link of said Ethernet network between two nodes of the MPLS network:

provisioning a first port at a first node in the MPLS network, wherein at least said first port at the first node being MPLS enabled and Ethernet enabled;

provisioning a second port at a second node in the MPLS network, wherein at least said second port at the second node being MPLS enabled and Ethernet enabled;

establishing, between the first port and the second port, an MPLS connection capable of carrying MPLS packets via at least one Label Switched Path (LSP, tunnel), the established MPLS connection being a bidirectional line between said first port and said second port.

handling and utilizing said established MPLS connection as an Ethernet link of an Ethernet network in the MPLS network (namely, by deploying Ethernet protocol on the link and further by transmitting there-through the dedicated MPLS LSPs.

The established MPLS connection may be a one-hop link between the two adjacent nodes, such a link intrinsically comprising two non-disjoint component unidirectional links.

Upon forming a plurality of such Ethernet links, and for ensuring that the obtained Ethernet network is loop-free, control messages (Ethernet signaling packets, such as BPDU messages) are to be exchanged between the nodes of the obtained Ethernet network. For a case of a single link/line network which is a priori known as a loop free Ethernet link, OAM messages can be used. The control messages are created by any standard Ethernet protocol as in a pure Ethernet network.

As has been mentioned above, the method then comprises forming the dedicated MPLS packets at one of the first and second nodes, transmitting them over said communication link and recognizing the dedicated MPLS packets at the other of said nodes "as quasi Ethernet packets". It should be noted that the specified LSP label used for forming a dedicated MPLS packet in one direction may be the same or not the same (though must be specified) when forming a dedicated MPLS packet in the opposite direction.

As has been mentioned above, the step of forming dedicated MPLS packets may be performed by encapsulating Ethernet packets using an LSP label only (i.e., no PW labels). That single preliminarily specified LSP label should indicate new services to be supported by the Ethernet network created for them. The proposed encapsulation will be further described and illustrated.

The invention will further provide a new Ethernet network built on top of an MPLS network, without utilizing the so-called full mesh of pseudo wires (PWs) of the MPLS network. The proposed Ethernet network preferably comprises more than one above-described Ethernet links formed between more than two dual-enabled nodes mentioned above.

More formally, there is provided a system, for example, an Ethernet network built on top of (within) an existing MPLS network, the system comprising:

at least two or more dual enabled nodes configured to support conventional Multi-Protocol Label Switched (MPLS) traffic serviced transport using conventional MPLS packets in addition to supporting one or more Ethernet traffic services carried in dedicated Ethernet over MPLS packets, wherein the at least two or more dual enabled nodes are connected by at least one or more bidirectional non-disjoint communication Label Switched Paths (LSP), which results in the at least one or more bidirectional non-disjoint communication label switched paths being Ethernet-enabled LSPs; wherein the at least two or more dual enabled nodes are further configured to encapsulate Ethernet packets received from external Ethernet networks using a dedicated label;

wherein upon receiving an Ethernet packet at at least one of the two or more dual enabled nodes from an external Ethernet network, the at least one of the two or more dual enabled node is configured to:

add a dedicated label before the Ethernet packet is encapsulated;

encapsulate the Ethernet packet received from the external Ethernet network and the added dedicated label in a conventional MPLS packet thereby forming an encapsulated packet;

forward the encapsulated packet over the one or more Ethernet enabled LSPs; and when one of the at least two or more dual enabled nodes receives the conventional MPLS packet, the dual enabled node is configured to:

forward the conventional MPLS packet over at least one non-disjoint labeled switched path which is not an Ethernet-enabled link.

The "Ethernet links" established on corresponding MPLS connections (preferably being one-hop bidirectional links) are intrinsically (first of all) suitable for a plurality of service related pseudo wires (PWs) of the MPLS network. Owing and according to the proposed invention, these links can be utilized to specified services which are handled as Ethernet services.

Consequently, ports between which any specific Ethernet link is established, are operative to handle specified LSP(s) carrying the specified services as Ethernet traffic streams, and to handle other LSPs which serve regular MPLS traffic, for example virtual private LAN services VPLS running over service-related pseudo wires PWs. Conventional MPLS packets of such services carry PW labels built on top of their respective LSP labels. In such a manner, two networks—MPLS and Ethernet—will exist simultaneously.

According to yet another aspect, the invention provides a double enabled network node in such a combined network. Such a node may be of two kinds: an "edge node" and an "internal node".

The edge node (such as a Provider Edge PE) connects an external Ethernet network and an MPLS network and is configured so that, in addition to its regular functions, in one direction the node is operative to receive an Ethernet packet from the external Ethernet network, to recognize a specified service (suitable for Ethernet-like treatment in MPLS network), to append a dedicated (predetermined) LSP label, and to forward thus obtained dedicated MPLS packet to the MPLS network according to Ethernet forwarding rules;

in the opposite direction, the node is operative to recognize a received dedicated MPLS packet by a dedicated LSP label, to remove said label and to forward thus obtained Ethernet packet to the Ethernet network.

The recognition of Ethernet packets of specified services at the node's Ethernet side (i.e., arriving to its user-network interface, UNI) can be made by configuring the node to recognize services carrying specific IEEE 802.1P identifications, VLAN tags, etc.

At the other side of the node (network-network interface NNI), the node should be capable of performing the proposed inventive encapsulation of Ethernet packets of the specified services into dedicated MPLS packets by appending to them specified/predetermined LSP labels, and service tags. The forwarding (and learning) of the dedicated MPLS packets, as quasi Ethernet packets (say, directing them to appropriate link or links) is performed regardless of MPLS labels except for the predetermined, dedicated LSP label. The de-capsulation of dedicated MPLS packets arriving at the node's MPLS side comprises removal of the dedicated LSP label and the service tag.

Similarly, the internal node (such as P) should be capable of recognizing the dedicated MPLS packets (dedicated Ethernet over MPLS packets) by the predetermined LSP labels, terminating and de-encapsulating them if required, and of forwarding and learning the dedicated MPLS packets.

As any other LSP traffic flow, the MPLS encapsulated dedicated packets may traverse any node intact if it is a transit node forming forwarding-adjacency over more than one hop, The learning and forwarding of the dedicated MPLS packets are performed according to forwarding and learning rules suitable for Ethernet packets (i.e., taking into account the specific source and destination addresses SA, DA multipoint destination, etc. and without any dependence on pseudo wire labels even if exist).

It should be kept in mind that the dual-enabled node is of course capable of label-based forwarding of regular MPLS packets from the node via corresponding regular LSPs being different from the specified LSP(s) predestined for the services which require Ethernet treatment.

For the proposed method/network, some or all nodes in the existing MPLS network should be such Ethernet-enabled, to allow forming the Ethernet network there-between. The inventive method is applied to those dual-enabled nodes.

There is also provided a software product comprising computer implementable instructions and/or data, stored on a suitable carrier medium, for carrying out the described method when being run at the described network node(s) and/or a control entity—and consequently, in the described network.

The most noticeable advantages of the created Ethernet paths/Ethernet network are such that any type of connectivity, especially the complex multipoint-to-multipoint (mp-t-mp) connectivity in the network, and traffic protection in the network can be provided in a simple manner, without dealing with the MPLS pseudowires. Also, the so-called timing over packet in the Ethernet network works better, since delays in the non-disjoint bidirectional links do not need performing any equalization.

The inventive encapsulation of Ethernet packets may utilize MPLS packets without PW labels, thereby avoiding utilization of the complex PW connectivity on the MPLS layer of the network.

Optionally but preferably, the proposed encapsulation also does not utilize an FRR ("fast reroute") label. The method thereby avoids the use of any complex measures to ensure the FRR protection of MPLS traffic over the MPLS links which underlay the created Ethernet links. Instead of that, protection in the created Ethernet network can be provided using any xSTP protocol. If the Ethernet network comprises a ring-like structure— it is even simpler and more advantageous. On such a virtual Ethernet network formed over an MPLS domain, the traffic protection can be provided by ERP protocol such as G.8032.

BRIEF DESCRIPTION OF THE DRAWINGS

The invention will be further described in detail with reference to the following non-limiting drawings, in which:

FIG. 3a, b, c schematically show Ethernet encapsulation performed for packets of different networks:

DETAILED DESCRIPTION OF PREFERRED EMBODIMENTS

Figure 1:
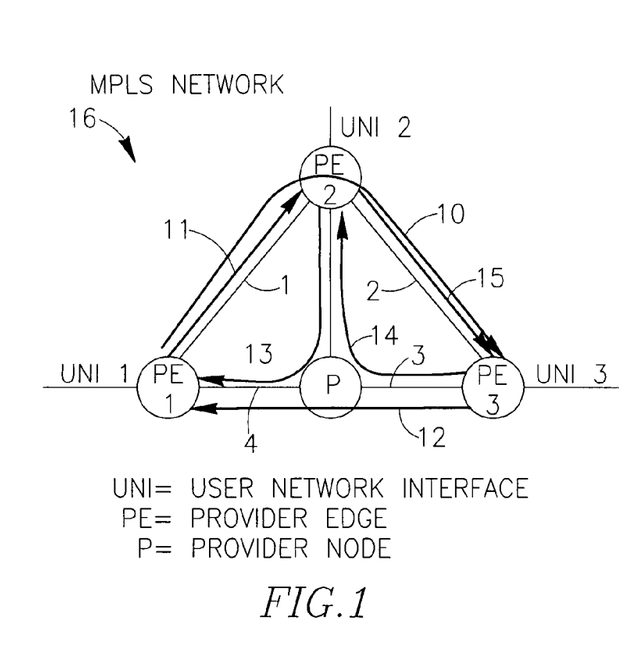
FIG. 1 schematically illustrates a portion of a communication MPLS network, where paths of MPLS services are shown by unidirectional lines (LSPs) utilizing service-related pseudowires (PWs).

FIG. 1 schematically shows a fragment of an existing MPLS 25 network 16, comprising three provider edge nodes PE1, PE2, PE3 and one provider node P. The nodes are interconnected by non-Ethernet physical layer links (Layer 1 links) 1, 2, 3, 4, over which a number of LSPs (label switched paths) are established. FIG. 1 illustrates the following pairs of LSPs to form bidirectional connections between pairs of nodes: 10 and 12; 11 and 13; 14 and 15. Each of these pairs of LSPs (say, 10 and 12) are associated with an MPLS pseudowire (PW) which provides a bidirectional connection between two nodes (here, PE2 and PE3).

Existing MPLS services (such as VPLS) are established in the MPLS network over the mentioned, per service pseudo wires. The LSPs 10-15 can be understood as paths of the MPLS services in the MPLS network 16.

The underlying Layer 1 network of the MPLS network 16 may be, for example, an SDH/SONET optical network.

Figure 2:
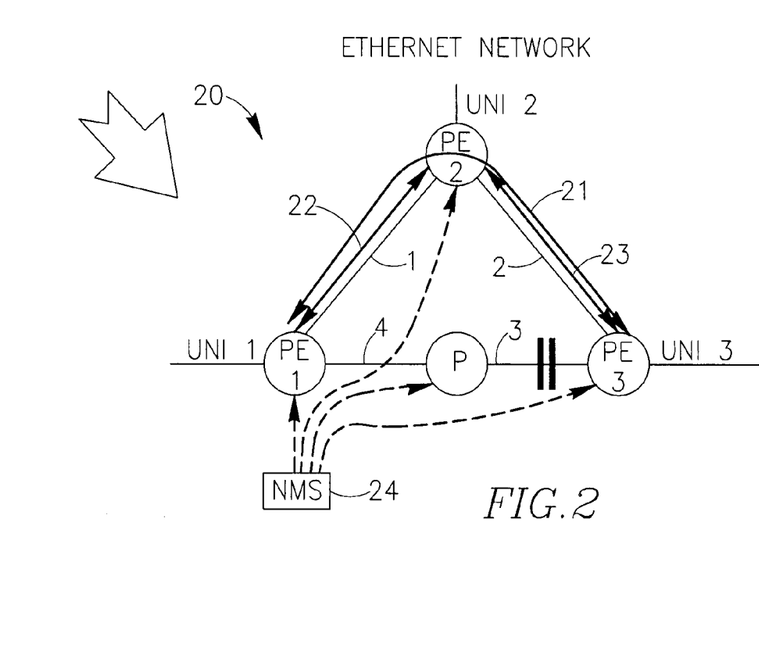
FIG. 2 schematically shows the same portion of the MPLS network, where Ethernet links are created and Ethernet services are established over these links, forming paths of such services in the Ethernet network created according to the invention in the MPLS network.

FIG. 2 is an example schematically illustrating a section of an Ethernet Provider Bridge (PB) network 20 formed within the MPLS network 16. The PB network is cited as an example; actually, a PBB (provider bridge backbone) network can be formed over MPLS, as well. Let us suppose that all nodes (all the edge nodes PE and the intermediate node P) in the existing network 16 are dual-enabled, i.e., are capable of providing both MPLS forwarding and Ethernet forwarding. Node P is not an exception, since it must potentially be capable to form an Ethernet link. Preferably node P has to be capable of performing encapsulation of a real Ethernet packet into a dedicated MPLS packet as the edge node PE of network 20 does.)

The dual capability of nodes in the existing MPLS network can be provided by software upgrade of nodes and NMS. Alternatively or in addition, the dual capability may be achieved by configuration of the node via command line interface CLI/network management system NMS.

Let us suppose that each of the links 1, 2, 3, 4 provides a one-hop bidirectional MPLS connection between adjacent nodes, and thus they may be all considered (assigned) as Ethernet links and therefore will form together the proposed Ethernet network 20. An Ethernet loop prevention protocol (xSTP, ERP) is then deployed on the network 20; as a result—one of the links (here, link 3) is logically disconnected (blocked, cut) to form a loop-free Ethernet network.

In the example shown in FIG. 2, Ethernet services are created over the bidirectional Ethernet links 1, 2, and form bidirectional service paths 21, 22 and 23. Suppose that the service path 22 is intended for some new service which has to be provided in the existing network between user 1 via its user network interface (UNI1), and user 2 via UNI2. Let another service path 21, which passes through the node PE2, is intended for another new service to be established between PE1 and PE3.

Transmission of the Ethernet traffic will be performed according to state of a specific port (forwarding or blocking, depending on the obtained loop-free topology).

The network 20 may actually operate without central management, but may be controlled by a network management system NMS 24 provided with additional functions. If provided, it will monitor the network topology, determine bidirectional MPLS connections between dual-enabled nodes, inform the dual-enabled nodes about their participation in an Ethernet network, will initiate a loop protocol in the Ethernet network and will also inform the dual-enabled nodes about new/specified traffic services which should be treated at the nodes as Ethernet services.

Figure 3A:
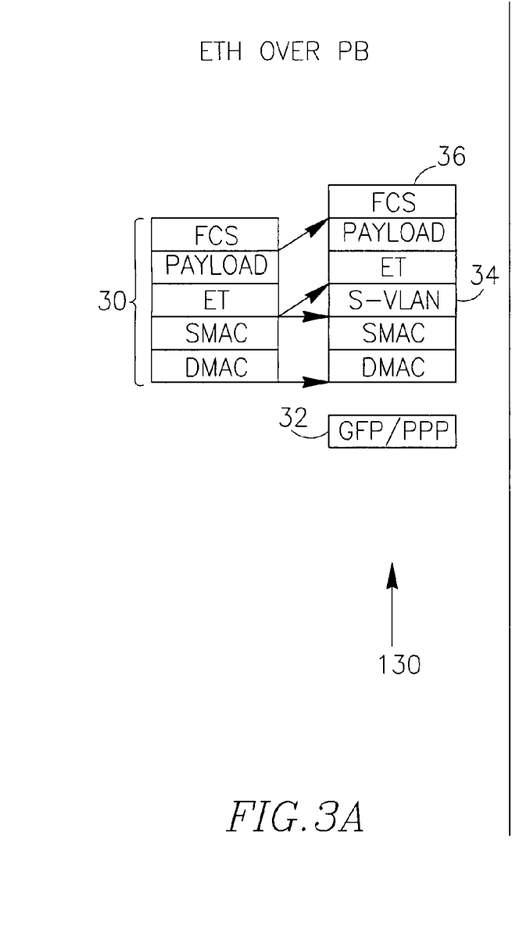
FIG. 3a (prior art)—shows how to form an Ethernet packet to be transmitted over a Provider Bridge (PB) network.

FIG. 3a illustrates a known type of Ethernet encapsulation which is provided in a PB network. An underlying non-Ethernet Layer 1 network (such as SDH/SONET, OTN, etc.) provides its suitable packets encapsulation headers 32, for example for GFP or PPP packets (Generic Framing Procedure packet or Point to Point Protocol Packet). A native Ethernet customer frame 30 is merged with the packet header 32; field 34 is added to indicate the S-VLAN service to which the packet will belong, and field FCS (Frame Check Sequence) is re-calculated and inserted as field 36 in the new obtained packet 130. As a result, the native Ethernet packet is encapsulated into the PB envelope.

Figure 3B:
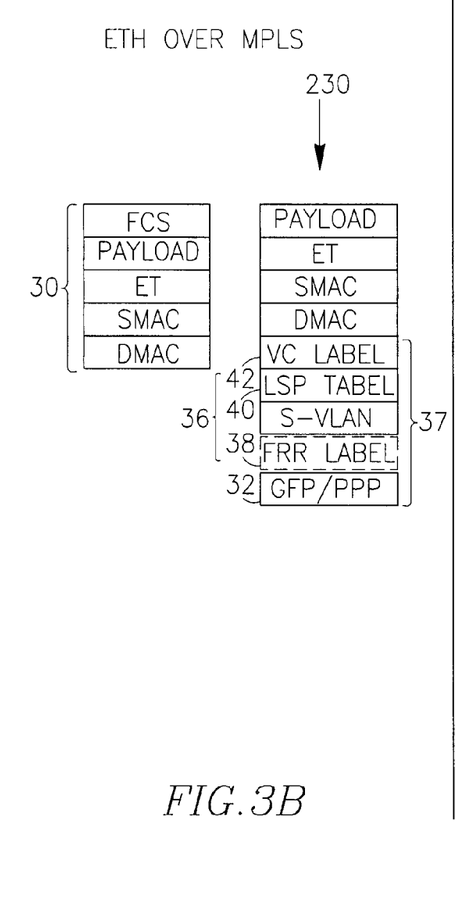
FIG. 3b (prior art)—shows a conventional way of forming an Ethernet packet for forwarding via an MPLS network.

FIG. 3b schematically illustrates how a native Ethernet customer's frame 30 can be transformed into an MPLS packet 230 according to the conventional EoMPLS technique.

In the packet 230, a Layer 1 packet header 32 is merged with the frame 30 and provided with an MPLS label stack 36 comprising an LSP label 40, a service label VC 42 (being a service related pseudo-wire PW label), and an optional MPLS fast reroute label FRR 38. All these added fields, combined with the customer's frame 30, form a conventional so-called Ethernet over MPLS packet 230. The field FCS is optional, it can be removed.

Here we see a conventional encapsulation of an Ethernet packet into the MPLS packet.

Figure 3C:
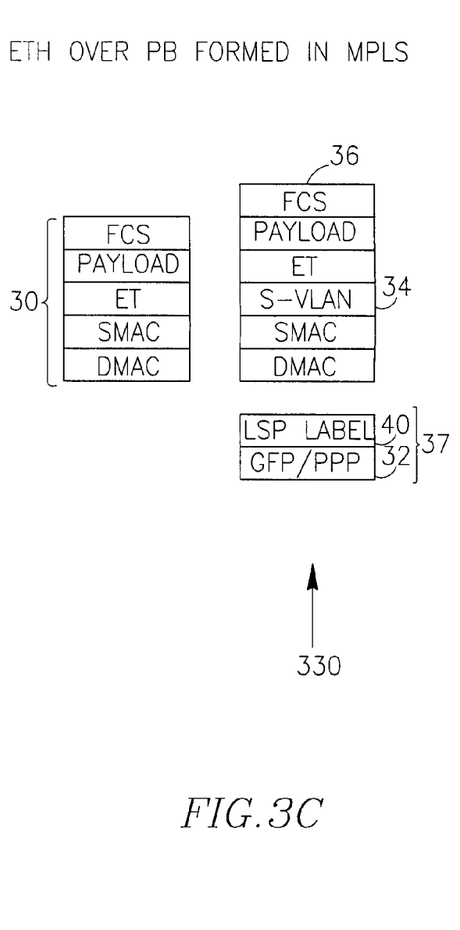
FIG. 3c—shows one proposed way of forming an Ethernet packet for forwarding in a Provider Bridge Ethernet network created in an MPLS network.

FIG. 3c. According to one embodiment of the proposed technique, the native Ethernet packet 30 may be encapsulated into an MPLS envelope by applying to the native frame 30 a service tag 34, a field 32 and a predetermined LSP label 40' only (without any Pseudo Wire label).

In FIG. 3c, it can be seen that the obtained MPLS packet 330 is a different MPLS packet provided with only one MPLS label 40' having a specified predetermined number/value according to which the packet is recognized as a "dedicated" packet which should be treated as an Ethernet packet in an Ethernet Provider Bridge (PB) network.

The packet 330 can be formed by an edge node, for example by node PE1 of the Ethernet network 20 in FIG. 2. When an Ethernet service traffic enters the user-network interface UNI1 of the node PE1, it is classified by type (SVC type, not shown) at the node. If the type of service is any existing MPLS service such as VPLS, the dual-enabled node handles the service according to the rules suitable for MPLS traffic. When a new service enters UNI of the node PE1 (say, the service specified by NMS or operator to be treated as Ethernet service), the packet is transformed by applying to it the MPLS encapsulation with the specified LSP label. The obtained packet is then forwarded according to its destination address (addresses) In FIG. 2, there is only one active Ethernet link outgoing from node PE1, so only one way of forwarding is possible. However, the node PE1 may have other outgoing Ethernet links and the packet may be sent to more than one of them, say if it is a multicast packet — see for example FIG. 4a.

Any dual-enabled node (see FIG. 2), when receiving an MPLS packet from the MPLS network, will look into the node's incoming label map ILM in order to handle and forward the packet correctly. In case of detecting the MPLS packet with a predetermined specified label 40', the packet should be forwarded as an Ethernet packet to form one or more outgoing flows, according to its destination.

Figure 4A:
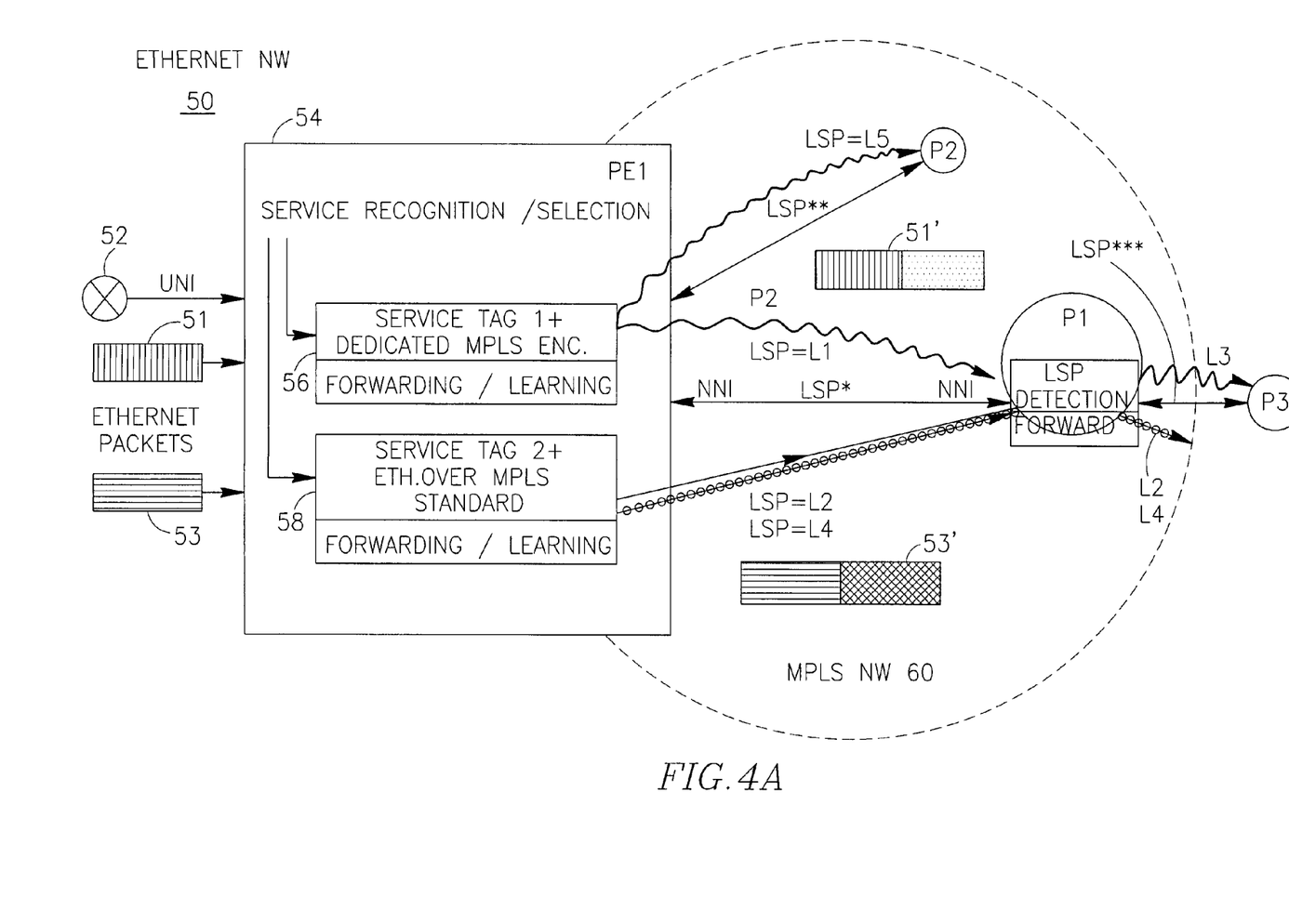
FIGS. 4a and 4b schematically illustrate how specified Ethernet services may be handled at double-enabled nodes of a quasi Ethernet network created within an MPLS network; an exemplary traffic stream is shown in two opposite directions.
Figure 4B:
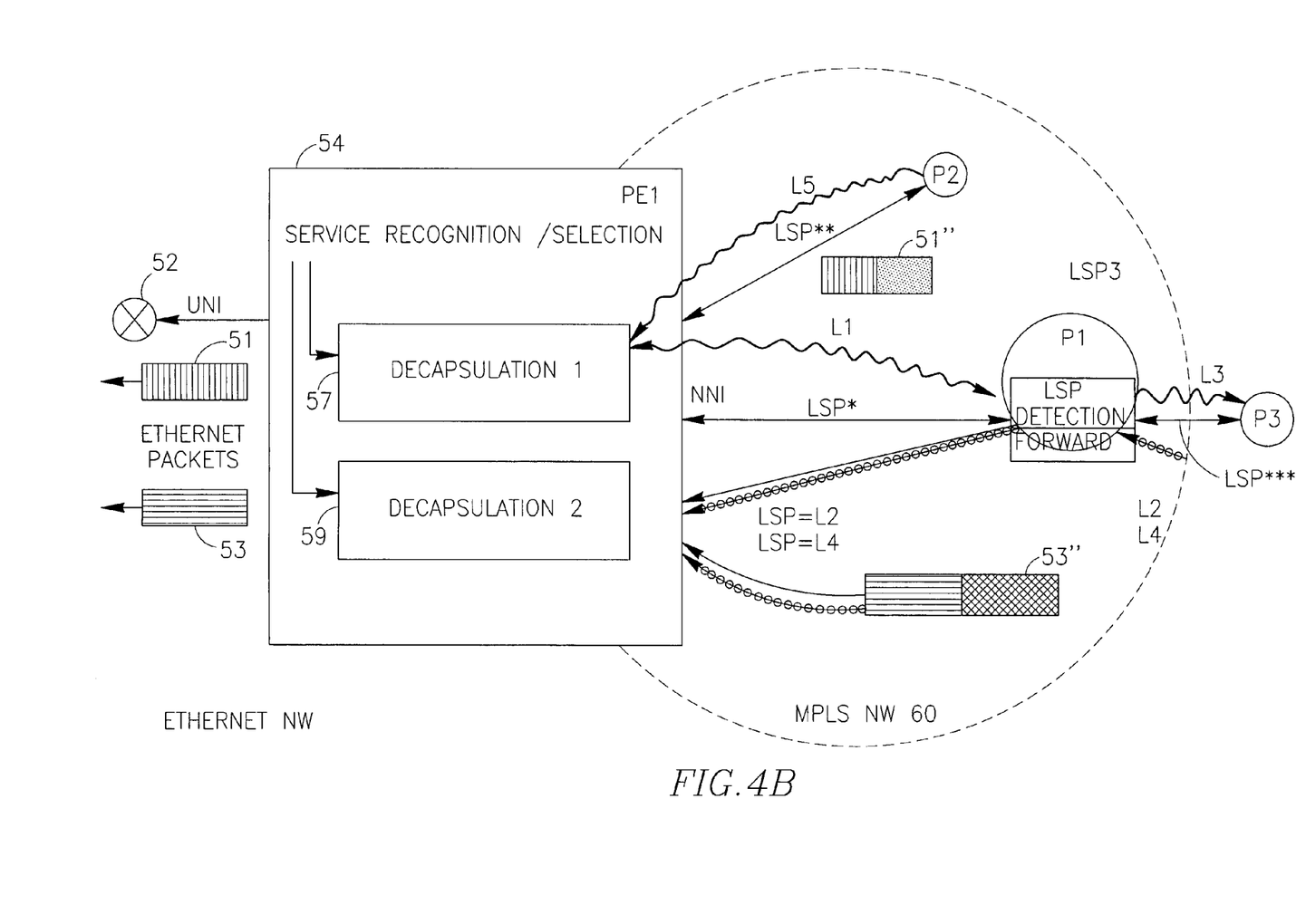

FIG. 4a shows a native Ethernet network 50 and an existing MPLS network 60. A customer's router 52 issues Ethernet packets 51 of one service type and Ethernet packets 53 of another service type. The Ethernet packets arrive to a user-network interface UNI of a Provider Edge node (PE1) marked 54. Node 54 is double-enabled, though mainly the novel inventive functionality of the node is illustrated in FIGS. 4a and 4b and discussed herein below. In the West-East direction, the node 54 recognizes packets of different received services and, depending on that, performs different encapsulations and applies different forwarding/learning rules to the packets. Let packet 51 is a multicast packet (say, belongs to Service 1) which should preferably be handled according to Ethernet forwarding rules, as was decided in advance. Node 54 is in advance configured to encapsulate Ethernet packets 51 by its internal functional block 56, to obtain so-called dedicated MPLS packets. Let the packet 51 (according to its address information) should reach two destinations: P2 and P3. Let, for simplicity, P1 and P2 are connected with the node 54 via two respective bidirectional one-hop links/LSPs (LSP* and LSP). Let link P1-P3 is also a one hop bidirectional link (LSP*). According to the invention, these three links can be successfully considered as Ethernet links. Block 56 encapsulates the packet 51 into an MPLS envelope and appends to it a Service tag 1 (S-VLAN) and: a specified, predetermined LSP label L1 for forwarding the dedicated packet 51' to P1, and a specified predetermined LSP label L5 for forwarding the dedicated packet 51' to P2. (Wavy lines marked by L1 and L5 indicate these two Ethernet data streams).

Let, for the purpose of this example, odd LSP labels are specified for Ethernet services, and even LSP labels are conventional MPLS labels. Node P1 recognizes the packet 51' as a dedicated MPLS packet, changes the label to L3 and forwards it to P3. FCS field of the packet may be recounted at this stage. If node P3 is the edge node, the packet will be de-encapsulated and the user will receive the initial native Ethernet packet (a similar example will be shown in FIG. 4b).

If the node 54 receives packet 53, and it belongs to a different service type, say service 2 being a point to point service, this fact indicates to node 54 that a conventional MPLS service should be applied to it, and the packet will be handled by a functional block 58. The packet will be enveloped as a conventional Ethernet over MPLS packet 53', will acquire an LSP label L2 and a pseudo wire (PW) label as well. Packet 53' may be forwarded along the LSP L2 via the same link PE1-P1 towards its destination in the MPLS network (the conventional MPLS traffic stream is shown as a "dotted" line marked with L2). Node P1 will recognize packet 53' as a regular MPLS packet and will forward it according to standard MPLS forwarding rules.

Note, that LSP L2 does not need "bidirectional non-disjoint character" of link PE1-P1, it will be seen in FIG. 4b. The service carried by packets 53' utilizes link PE1-P1 as a regular link of MPLS network. Other conventional services may use the same link and be marked with LSP L4.

FIG. 4b illustrates what may happen in the opposite direction. In this example, the dedicated MPLS packet 51" carrying the LSP label L1 along a bidirectional LSP* (Ethernet link) arrives to the node 54, the node will detect the specified LSP as the one carrying quasi-Ethernet traffic, and will de-capsulate the packet by block 57. Similarly might be processed a packet (not shown) arriving along the bidirectional LSP** and carrying the specified LSP label L5. The de-capsulated packets will be forwarded to the customer's router 52.

However, a packet 53" arriving to the node 54 from node P3 and carrying a non-specified LSP label L4 will be handled differently. (Note, that packet 53" even arrives via another link, i.e., the MPLS pseudo-wire used for transmitting that service comprises two disjoint unidirectional LSPs). The packet 53" will be transformed by block 59 and issued to the native Ethernet customer equipment 52.

Therefore, in this example, the edge node 54 is configured so that in one direction it receives packets from Ethernet network, recognizes a suitable service, appends a service tag, appends a dedicated (predetermined, specified) LSP label and forwards the packet to MPLS network according to Ethernet forwarding rules. In the other direction, the node recognizes the dedicated LSP label, removes it, and sends the Ethernet packet to the Ethernet client.

It should be appreciated that other configurations of the Ethernet network can be formed in MPLS network, additional embodiments of the dual-enabled node can be used for that, and other versions of the method can be proposed. All such variations should be considered part of the invention whenever defined by the claims which follow.

The invention claimed is:

1. A method for configuring two nodes in a Multiple Protocol Label Switched (MPLS) network to transport Ethernet packets, said method comprising:
    configuring, by a Network Management System (NMS) terminal, a connection between a first node and a second node in the MPLS network to support one or more non-disjoint label switched paths (LSPs) and configuring said two nodes to perform Ethernet to MPLS protocol encapsulation in addition to MPLS switching, which results in the first node and the second node being Ethernet-enabled nodes and the one or more non-disjoint LSPs to be Ethernet enabled links;
    upon receiving at either the first node or the second node an Ethernet packet from an external Ethernet network, adding a dedicated label which is determined based upon traffic service specified in the received Ethernet packet before the Ethernet packet is encapsulated within a MPLS packet thereby forming an encapsulated packet, and forwarding the encapsulated packet over the Ethernet enabled links; and
    upon receiving at either the first node or the second node a conventional MPLS packet which does not contain the dedicated label, forwarding said conventional MPLS packet over at least one LSP which is not an Ethernet enabled link.

2. The method according to claim 1, wherein the MPLS protocol encapsulation is performed by encapsulating the Ethernet packet within a MPLS packet and by adding one or more dedicated MPLS labels.

3. The method according to claim 1, wherein the dedicated label is only added as an indication of the Ethernet packet associated with a particular traffic service.

4. The method according to claim 1, wherein labels in the MPLS packet are used to determine whether the MPLS packet is to be forwarded based upon MPLS rules or Ethernet rules.

5. A non-transitory computer readable medium storing instructions which when executed by a Network Management System terminal perform the following:
    configuring, by the Network Management System (NMS) terminal, a connection between a first node and a second node in the MPLS network to support one or more non-disjoint label switched paths (LSPs) and configuring said two nodes to perform Ethernet to MPLS protocol encapsulation in addition to MPLS switching, which results in the first node and the second node being Ethernet-enabled nodes and the one or more non-disjoint LSPs to be Ethernet enabled links;
    upon receiving at either the first node or the second node an Ethernet packet from an external Ethernet network, adding a dedicated label which is determined based upon traffic service specified in the received Ethernet packet before the Ethernet packet is encapsulated within a MPLS packet thereby forming an encapsulated packet, and forwarding the encapsulated packet over the Ethernet enabled links; and
    upon receiving at either the first node or the second node a conventional MPLS packet which does not contain the dedicated label, forwarding said conventional MPLS packet over at least one LSP which is not an Ethernet enabled link.

6. A system comprising:
    at least two or more dual enabled nodes configured to support conventional Multi-Protocol Label Switched (MPLS) traffic serviced transport using conventional MPLS packets in addition to supporting one or more Ethernet traffic services carried in dedicated Ethernet over MPLS packets,
    wherein the at least two or more dual enabled nodes are connected by at least one bidirectional non-disjoint communication Label Switched Path (LSP), which results in the at least one bidirectional non-disjoint communication LSP being an Ethernet-enabled LSP;
    wherein the at least two or more dual enabled nodes are further configured to encapsulate Ethernet packets received from external Ethernet networks using a dedicated label;
    wherein, upon receiving an Ethernet packet at at least one of the two or more dual enabled nodes from an external Ethernet network, said at least one of the two or more dual enabled node is configured to:
        add a dedicated label before the Ethernet packet is encapsulated;
        encapsulate the Ethernet packet received from the external Ethernet network and the added dedicated label in a MPLS packet thereby forming an encapsulated packet;
        forward the encapsulated packet over the at least one Ethernet enabled LSP; and
    when one of the at least two or more dual enabled nodes receives a conventional MPLS packet, the dual enabled node is configured to:
        forward the conventional MPLS packet over at least one non-disjoint switched labeled path which is not an Ethernet-enabled link.

* * * * *